(12) United States Patent
Ikegami

(10) Patent No.: US 8,522,845 B2
(45) Date of Patent: Sep. 3, 2013

(54) PNEUMATIC TIRE

(75) Inventor: Tetsuo Ikegami, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1101 days.

(21) Appl. No.: 12/250,331

(22) Filed: Oct. 13, 2008

(65) Prior Publication Data

US 2009/0101260 A1    Apr. 23, 2009

(30) Foreign Application Priority Data

Oct. 23, 2007 (JP) ................................ 2007-275385

(51) Int. Cl.
  *B60C 11/13*    (2006.01)
(52) U.S. Cl.
  USPC ............. 152/209.22; 152/209.1; 152/209.18; 152/209.25; 152/DIG. 3; D12/500; D12/502; D12/507; D12/512; D12/568; D12/574; D12/593
(58) Field of Classification Search
  USPC ............... 152/209.1, 209.18, 209.25, DIG. 3, 152/209.22; D12/500, 502, 507, 512, 568, D12/574, 593
  See application file for complete search history.

(56) References Cited

U.S. PATENT DOCUMENTS 6,003,574 A * 12/1999 Boiocchi et al. ........... 152/209.1
2003/0226629 A1* 12/2003 Kimishima .............. 152/209.18

FOREIGN PATENT DOCUMENTS

| JP | 07101210 A * | 4/1995 |
| JP | A 2003-146016 | 5/2003 |
| JP | A 2003-211921 | 7/2003 |
| JP | A 2005-297880 | 10/2005 |

* cited by examiner

*Primary Examiner* — Jacob Thomas Minskey
(74) *Attorney, Agent, or Firm* — Greer, Burns & Crain, Ltd.

(57) ABSTRACT

Provided is a pneumatic tire which is capable of securing a driving stability on dry road surfaces and concurrently of improving snow performance without worsening its pattern noise. The pneumatic tire includes four main grooves each extending in its tread part in a tire circumferential direction, and the four main grooves partition the tread part into: a center land part; paired intermediate land parts located with the center land part being interposed in between; and paired shoulder land parts located with the center land part and the paired intermediate land parts being interposed in between. Each of the intermediate land parts and the shoulder land parts includes multiple V-shaped grooves each configured of: a thick groove part extending in a tire width direction; and a thin groove part extending in the tire circumferential direction. The V-shaped grooves are arranged in a way that each paired V-shaped grooves are opposed to each other in the tire circumferential direction with a connecting groove part being interposed between vertices of the respective paired V-shaped grooves. Each thick groove part communicates with the main grooves or the outside of a ground contacting area. Each thin groove part terminates within the land part.

7 Claims, 2 Drawing Sheets

PNEUMATIC TIRE

BACKGROUND OF THE INVENTION

1. Field of the Invention

The present invention relates to a pneumatic tire provided with four main grooves extending in the tire circumferential direction in its tread part. Specifically, the present invention relates to a pneumatic tire which has a secured driving stability on dry road surfaces and concurrently which has an improved snow performance without worsening its pattern noise.

2. Description of the Related Art

Various proposals have been so far made on a type of pneumatic tire which is provided with four main grooves each extending in the tire circumferential direction in its tread part, and the four main grooves partition the tread part into: a center land part; paired intermediate land parts located with the center land part being interposed in between; and paired shoulder land parts located with the center land part and the paired intermediate land parts being interposed in between (see Japanese patent application Kokai publications No. 2005-297880, No. 2003-211921 and No. 2003-146016, for example).

Increasing the number of groove in the tread part can possibly improve the snow performance of such pneumatic tire, yet, at the same time, its pattern noise as well as its driving stability on dry road surfaces tends to be deteriorated. For this reason, it is demanded that the tire of the foregoing type should have an improved snow performance without inviting these problems.

SUMMARY OF THE INVENTION

An object of the present invention is to provide a pneumatic tire which is capable of securing a driving stability on dry road surfaces and concurrently of improving snow performance without worsening its pattern noise.

In order to achieve the above-mentioned object, a pneumatic tire according to the present invention is provided with four main grooves each extending in its tread part in the tire circumferential direction, and these main grooves partition the tread part into: a center land part; paired intermediate land parts located with the center land part being interposed in between; and paired shoulder land parts located with the center land part and the paired intermediate land parts being interposed in between. Each of the intermediate land parts and the shoulder land parts includes multiple V-shaped grooves each configured of a thick groove part extending in the tire width direction and a thin groove part extending in the tire circumferential direction. The V-shaped grooves are arranged in a way that each paired V-shaped grooves are opposed to each other in the tire circumferential direction with a connecting groove part being interposed between vertices of the respective paired V-shaped grooves. Each thick groove part communicates with any one of the main grooves and the outside of a ground contacting area depending on which land part the thick groove part belongs to; and each thin groove part terminates within the land part to which the thin groove part belongs.

The present invention ensures a sufficient drainage for the pneumatic tire, since each of the intermediate land parts and the shoulder land parts is provided with the multiple V-shaped grooves, and also because each thick groove part is extended in the tire width direction to communicate with any one of the main grooves and the outside of the ground contacting area depending on which land part the thick groove part belongs to. The present invention also ensures a sufficient edge effect for turning on the snow, since each thin groove part is extended in the tire circumferential direction. Such design improves snow performance of the pneumatic tire. In addition, the present invention causes the thin groove part of each V-shaped groove to terminate within a land part to which the V-shaped groove belongs. Such design prevents the reduction of the rigidity of each land part to a large extent, and consequently ensures the driving stability on dry road surfaces. Moreover, in the present invention, the V-shaped grooves are arranged in a way that each paired V-shaped grooves are opposed to each other in the tire circumferential direction with the connecting groove part being interposed between the vertices of the respective paired V-shaped grooves. This design avoids aligning the thick groove part of one of the paired V-shaped grooves with the thick groove part of the other of the paired V-shaped grooves in a straight line. Therefore, such design can avoid worsening the pattern noise of the tire.

In order to improve the driving stability on the dry road surfaces and the snow performance as well as to control the pattern noise, the following configurations should be preferably employed in the present invention. It is desirable that, in each V-shaped groove, an inclination angle $\theta 1$ of the thick groove part communicating with its corresponding main groove to the tire circumferential direction should be set at 40° to 70°. It is desirable that, in each V-shaped groove, an inclination angle $\theta 2$ of the thick groove part communicating with the outside of the ground contacting area to the tire circumferential direction should be set at 55° to 80°. It is desirable that, in each V-shaped groove, an inclination angle $\theta 3$ of the thin groove part to the tire circumferential direction should be set at 2° to 20°. Moreover, it is desirable that a distance L between the vertices of respective paired V-shaped grooves in the tire circumferential direction should be set at 1 mm to 6 mm.

In addition, it is desirable that the center land part include multiple notched grooves each extending in the tire width direction and multiple sipes extending in the tire width direction from the corresponding tip part of the notched grooves, and that the notched grooves and the sipes divide the center land part into blocks arranged one after another in the tire circumferential direction. It is desirable that, in each of the intermediate land parts and the shoulder land parts, each of blocks demarcated by the V-shaped grooves should include at least one sipe. In particular, it is desirable that, in each of the intermediate land parts and the shoulder land parts, each of blocks demarcated by the V-shaped grooves includes at least one sipe including a sipe communicating with the thick groove part of the V-shaped groove corresponding to the block.

DETAILED DESCRIPTION OF THE PREFERRED EMBODIMENT

Figure 1:
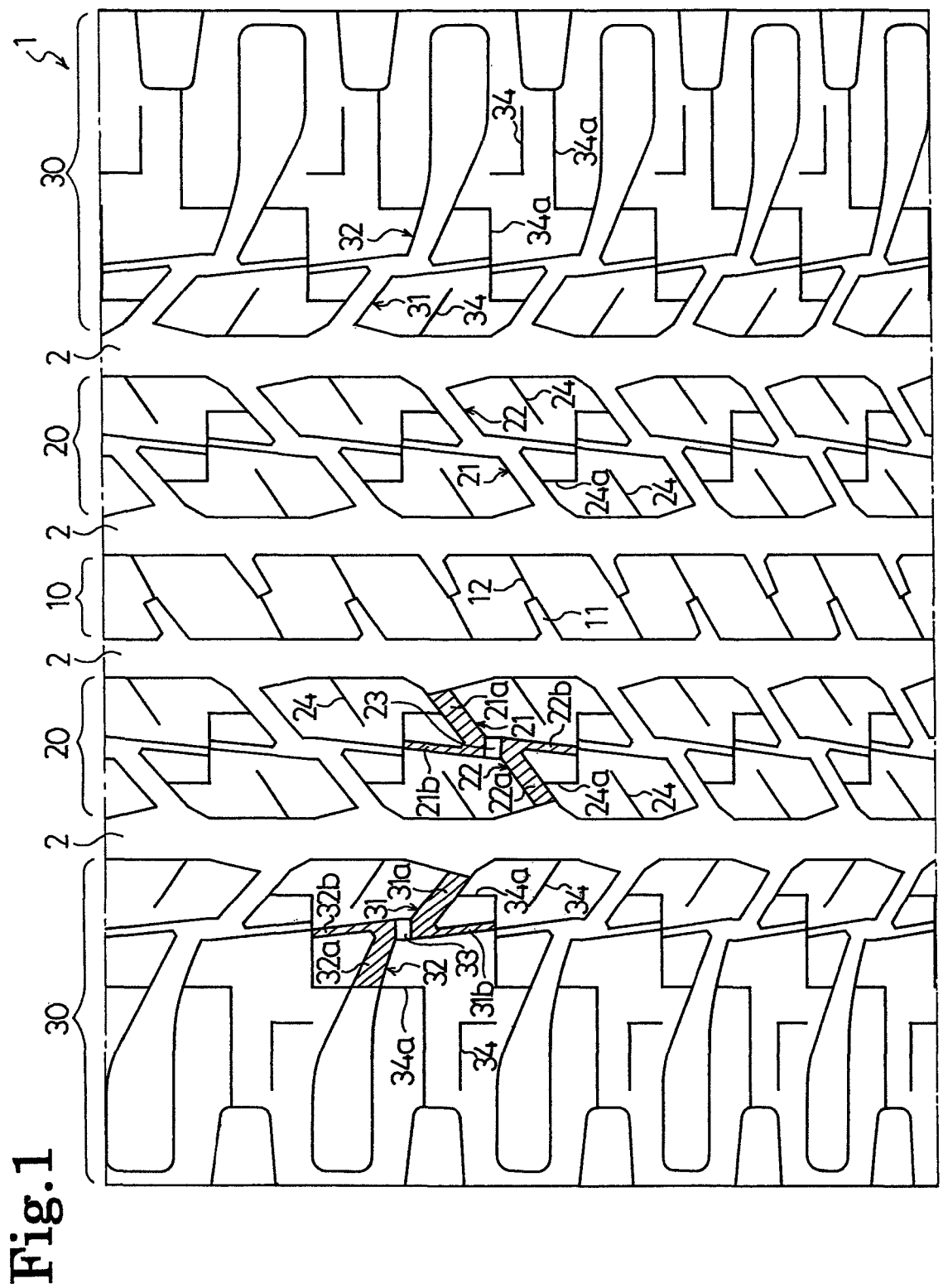
FIG. 1 is a development view showing a tread pattern of a pneumatic tire according to an embodiment of the present invention.
Figure 2:
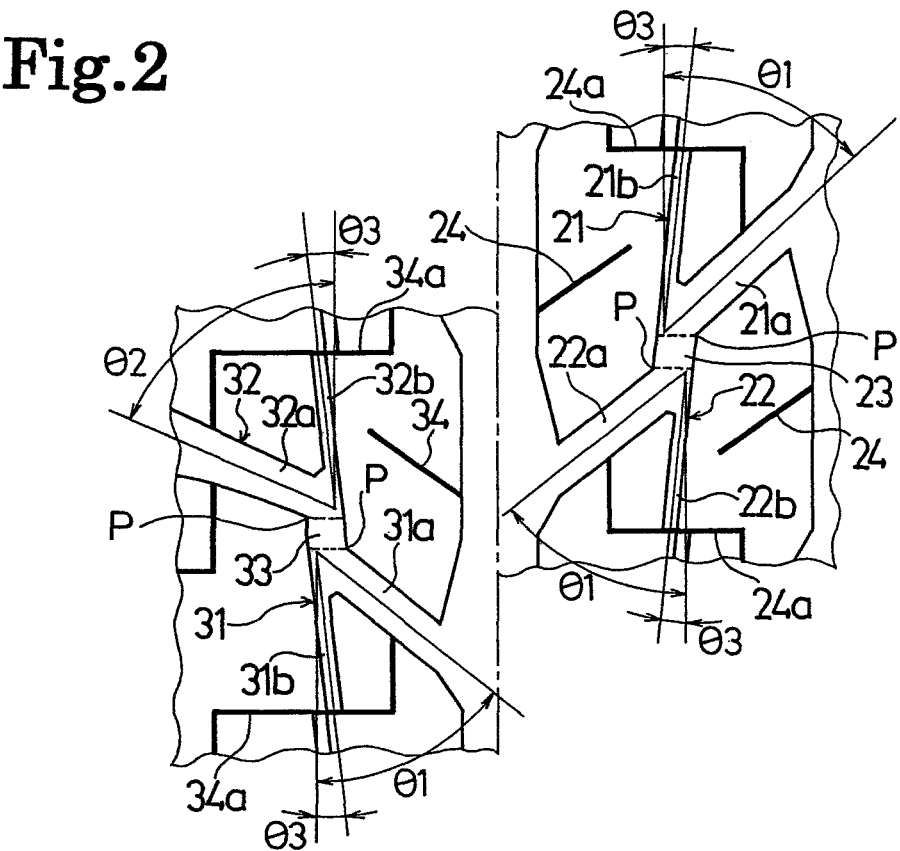
FIG. 2 is a magnified view showing a chief part of the tread pattern shown in FIG. 1.

Detailed descriptions will be provided hereinbelow for the configuration according to the present invention by referring to the attached drawings. FIG. 1 is a development view showing a tread pattern of a pneumatic tire according to an embodiment of the present invention. FIG. 2 is a magnified view showing a chief part of the tread pattern shown in FIG. 1.

As shown in FIG. 1, four main grooves 2 each extending straight in the tire circumferential direction are formed in a tread part 1. These main grooves 2 partition the tread part 1 into: a center land part 10 located in the tread center; paired intermediate land parts 20 located with the center land part being interposed in between; and paired shoulder land parts 30 located with the center land part 10 and the paired intermediate land parts 20 being interposed in between.

In the foregoing pneumatic tire, multiple notched grooves 11 and multiple sipes 12 are formed in the center land part 10. The notched grooves 11 extend in the tire width direction. The sipes 12 extend in the tire width direction from a tip of the respective notched grooves 11. The notched grooves 11 are arranged at predetermined intervals in the tire circumferential direction in a way that the notched grooves 11 communicating with an edge portion of the center land part 10 alternate with the notched grooves 11 communicating with the other edge portion of the center land part 10. Similarly, the sipes 12 are arranged at predetermined intervals in the tire circumferential direction in a way that the sipes 12 communicating with an edge portion of the center land part 10 alternate with the sipes 12 communicating with the other edge portion of the center land part 10. The notched grooves 11 and the sipes 12 divide the center land part 10 into blocks arranged one after another in the tire circumferential direction. The notched grooves 11 exhibit the traction performance during snow driving, and also do not impair the driving stability on dry road surfaces, because none of the notched grooves 11 cut across the center land part 10 singly. On the other hand, the sipes 12, which are narrower than the notched grooves 11 in width, reduce the rigidity of the center land part 10 to an appropriate extent, and thus help to prevent uneven tire wear.

Multiple V-shaped grooves 21 and multiple V-shaped grooves 22 are formed in each intermediate land part 20. Each V-shaped groove 21 is configured of: a thick groove part 21a extending in the tire width direction; and a thin groove part 21b extending in the tire circumferential direction. Each V-shaped groove 22 is configured of: a thick groove part 22a extending in the tire width direction; and a thin groove part 22b extending in the tire circumferential direction. For the purpose of easy understanding, one V-shaped groove 21 and one V-shaped groove 22 are highlighted with shadow. In each V-shaped groove 21, the thick groove part 21a communicates with a main groove 2 located closer to the tread center whereas the thin groove part 21b extending in a first tire circumferential direction terminates within the intermediate land part 20. On the other hand, in each V-shaped groove 22, the thick groove part 22a communicates with a main groove 2 located closer to the shoulder whereas the thin groove part 22b extending in a second tire circumferential direction terminates within the intermediate land part 20. The V-shaped grooves 21 and 22 are arranged in a way that each paired V-shaped grooves 21 and 22 are opposed to each other in the tire circumferential direction with a connecting groove part 23 being interposed between the vertices of the respective paired V-shaped grooves 21 and 22.

As described above, each intermediate land part 20 is designed to include the multiple V-shaped grooves 21 and 22. The thick groove parts 21a and 22a extending in the tire width direction are designed to communicate with main grooves 2. This design makes it possible to secure a sufficient drainage for the pneumatic tire. On the other hand, the thin groove parts 21b and 22b are designed to extend in the tire circumferential direction. This design makes it possible to secure a sufficient edge effect when turning on the snow. In addition, the thin groove parts 21b of the corresponding V-shaped grooves 21 and the thin groove parts 22b of the corresponding V-shaped grooves 22 are designed to terminate within the intermediate land part 20. This design makes it possible to prevent the reduction of rigidity of the intermediate land part 20 to a large extent, and thus to secure the driving stability on dry road surfaces. Furthermore, the V-shaped grooves 21 and 22 are arranged in a way that each paired V-shaped grooves 21 and 22 are opposed to each other in the tire circumferential direction with the connecting groove part 23 being interposed between the vertices of the respective paired V-shaped grooves 21 and 22. This arrangement causes none of the thick groove parts 21a of the respective paired V-shaped grooves 21 to be aligned with any one of the thick groove parts 22a of the respective paired V-shaped grooves 22 in a straight line. As a result, this design makes it possible to avoid worsening the pattern noise of the pneumatic tire.

In each intermediate land part 20, multiple sipes 24 including a sipe 24a are formed in each of the blocks demarcated by the V-shaped grooves 21 and 22. The sipe 24a communicates with the thick groove part 21a and 22a of a V-shaped groove 21 and 22, respectively. These sipes 24 exert the edge effects on the ice, and contribute to the reduction of the pattern noise of the tire by decreasing the rigidity of the intermediate land parts 20. Particularly, each sipe 24a efficiently decreases the rigidity of its corresponding block leading edge part, because the sipe 24a includes a component extending in the tire circumferential direction and communicates with its corresponding thick groove part 21a and 22a.

Multiple V-shaped grooves 31 and multiple V-shaped grooves 32 are formed in each shoulder land part 30. Each V-shaped groove 31 is configured of: a thick groove part 31a extending in the tire width direction; and a thin groove part 31b extending in the tire circumferential direction. Each V-shaped groove 32 is configured of: a thick groove part 32a extending in the tire width direction; and a thin groove part 32b extending in the tire circumferential direction. For the purpose of easy understanding, one V-shaped groove 31 and one V-shaped groove 32 are highlighted with shadow. In each V-shaped groove 31, the thick groove part 31a communicates with a main groove 2 located closer to the tread center whereas the thin groove part 31b extending in the second tire circumferential direction terminates within the shoulder land part 30. On the other hand, in each V-shaped groove 32, the thick groove part 32a communicates with the outside of the ground contacting area whereas the thin groove part 32b extending in the first tire circumferential direction terminates within the shoulder land part 30. The V-shaped grooves 31 and 32 are arranged in a way that each paired V-shaped grooves 31 and 32 are opposed to each other in the tire circumferential direction with a connecting groove part 33 being interposed between the vertices of the respective paired V-shaped grooves 31 and 32.

As described above, each shoulder land part 30 is designed to include the multiple V-shaped grooves 31 and 32. The thick groove parts 31a and 32a extending in the tire width direction are designed to communicate with the main groove 2 or the outside of the ground contacting area. This design makes it possible to secure a sufficient drainage for the pneumatic tire. On the other hand, the thin groove parts 31b and 32b are designed to extend in the tire circumferential direction. This design makes it possible to secure a sufficient edge effect when turning on the snow. In addition, the thin groove parts 31b of the corresponding V-shaped grooves 31 and the thin groove parts 32b of the corresponding V-shaped grooves 32 are designed to terminate within the shoulder land part 30. This design makes it possible to prevent the reduction of rigidity of the shoulder land part 30 to a large extent, and thus to secure the driving stability on dry road surfaces. Furthermore, the V-shaped grooves 31 and 32 are arranged in a way that each paired V-shaped grooves 31 and 32 are opposed to each other in the tire circumferential direction with the connecting groove part 33 being interposed between the vertices of the respective paired V-shaped grooves 31 and 32. This arrangement causes none of the thick groove parts 31a of the respective paired V-shaped grooves 31 to be aligned with any one of the thick groove parts 32a of the respective paired V-shaped grooves 32 in a straight line. As a result, this design makes it possible to avoid worsening the pattern noise of the pneumatic tire.

In each shoulder land part 30, multiple sipes 34 including a sipe 34a are formed in each of the blocks demarcated by the V-shaped grooves 31 and 32. The sipe 34a communicates with the thick groove part 31a and 32b of a V-shaped groove 31 and 32, respectively. These sipes 34 exert the edge effects on the ice, and contribute to the reduction of the pattern noise of the tire by decreasing the rigidity of the shoulder land parts 30. Particularly, each sipe 34a efficiently decreases the rigidity of its corresponding block leading edge part, because the sipe 34a includes a component extending in the tire circumferential direction and communicates with its corresponding thick groove part 31a and thick groove part 32a.

In order for the above-described pneumatic tire to improve the driving stability on dry road surfaces and the snow performance as well as to control the pattern noise, it is desirable that, in each of the V-shaped grooves 21, 22 and 31, the inclination angle θ1 of each of the thick groove parts 21a, 22a and 31a communicating with their corresponding main grooves 2 to the tire circumferential direction should be set at 40° to 70°, and more preferably 45° to 65°. It is desirable that, in each V-shaped groove 32, the inclination angle θ2, to the tire circumferential direction, of the thick groove part 32a communicating with the outside of the ground contacting area should be set at 55° to 80°, and more preferably 60° to 75°. It is desirable that, in each of the V-shaped grooves 21, 22, 31 and 32, the inclination angle θ3 of each of the thin groove parts 21a, 22a, 31a and 31b to the tire circumferential direction should be set at 2° to 20°, and more preferably 5° to 10° (see FIG. 2).

If the inclination angle θ1 of each of the thick groove parts 21a, 22a and 31a communicating with their corresponding main grooves 2 is too small, such an angle induces the reduction of the block rigidity, which in turn leads to a deterioration of the driving stability on dry road surfaces and of the traction on the snow. On the contrary, if the inclination angle θ1 is too large, the pattern noise of the pneumatic tire is worsened. In addition, if the inclination angle θ2 of each thick groove part 32a communicating with the outside of the ground contacting area is too small, the drainage of the tire is deteriorated. On the contrary, if the inclination angle θ2 is too large, the pattern noise of the tire is worsened. Moreover, if the inclination angle θ3 of each of the thin groove parts 21b, 22b, 31b and 32b is too large, the edge effect for turning on the snow is deteriorated.

It is desirable that the distance L between the vertices of each paired V-shaped grooves 21 and 22 in the tire circumferential direction as well as the distance L between the vertices of each paired V-shaped grooves 31 and 32 in the tire circumferential direction should be 1 mm to 6 mm, and more preferably 2 mm to 4 mm (see FIG. 2). The positions of the vertices of each paired V-shaped grooves 21 and 22 in the tire circumferential direction are defined by an inflection point P between the thick groove part 21a and the corresponding connecting groove part 23 and an inflection point P between the thick groove part 22a and the same connecting groove part 23, respectively. The positions of the vertices of each paired V-shaped grooves 31 and 32 in the tire circumferential direction are defined by an inflection point P between the thick groove part 31a and the corresponding connecting groove part 33 and an inflection point P between the thick groove part 32a and the same connecting groove part 33, respectively.

In this respect, if the distance L between the vertices of corresponding paired V-shaped grooves in the tire circumferential direction is too short, such a short distance makes the thick groove parts of the paired V-shaped grooves close to each other. This worsens the pattern noise of the tire. On the contrary, if the distance L is too long, such a long distance elongates the connecting groove part 23 (33). This reduces the area of the ground contacting portion of the tire, and decreases the driving stability on dry road surfaces.

The foregoing detailed descriptions have been provided for the preferred embodiment of the present invention. Nevertheless, it shall be understood that various modifications, substitutions and replacements are applicable to the present invention as long as they are not departing from the concept and scope of the present invention set forth in the accompanying claims.

EXAMPLES

Figure 3:
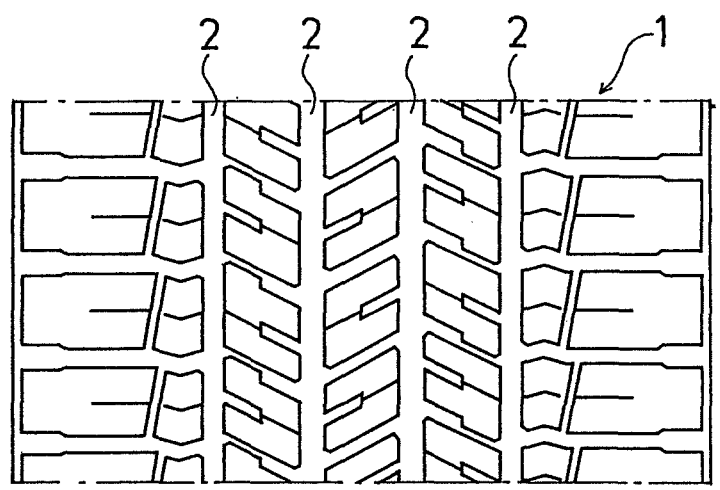
FIG. 3 is a plan view showing a tread pattern of a conventional pneumatic tire.

Pneumatic tires according to Examples 1 to 5 and Comparative Examples 1 to 2 (see Table 1) were produced with the following conditions. The tire size of the pneumatic tires was P245/60R20 (in TRA (Tire and Rim Association) Standards). Each pneumatic tire was provided with four main grooves each extending in its tread part in the tire circumferential direction so that the four main grooves partitioned the tread part into: a center land part; paired intermediate land parts located with the center land part being interposed in between; and paired shoulder land parts located with the center land part and the paired intermediate land parts being interposed in between. Each pneumatic tire had the following tread pattern. Each of the intermediate land parts and the shoulder land parts was provided with multiple V-shaped grooves each configured of a thick groove part extending in the tire width direction; and a thin groove part extending in the tire circumferential direction. These V-shaped grooves were arranged in a way that each paired V-shaped grooves were opposed to each other in the tire circumferential direction with a connecting groove part being interposed between the vertices of the respective paired grooves. Each thick groove part communicated with one of the main grooves or the outside of the ground contacting area depending on which land part the thick groove part belonged to. Each thin groove part terminates within the land part to which the thin groove part belongs. The groove width of each thick groove part and thin groove part, the inclination angles θ1 to θ3 of the V-shaped grooves, and the distance L between the vertices of the respective paired V-shaped grooves in the tire circumferential direction were set differently from one example to another as shown in Table 1. For comparison, a conventional type of tire with a tread pattern shown in FIG. 3 was prepared. Note that all of the tires had a same groove area. In Table 1, a value for the distance L with a minus sign means that the vertices of the paired V-shaped grooves crossed over each other.

The following evaluation methods was used to evaluate each of these tires, in terms of the braking ability on the snow, the turnability on the snow, the driving stability and the pattern noise. The result of the evaluation is shown in Table 1.

Braking Ability on the Snow:

The experimental tires were mounted on wheels having a rim size of 20×7J and installed in a four-wheel-drive automobile. The air pressure applied to each experimental tire was 220 kPa. Braking was applied to the automobile running at 40 km/h, then the braking distance until the automobile completely stopped was measured. By use of the inverse numbers of the respective measured values, the results of the evaluations of Examples 1 to 5 and Comparative Examples 1 to 2 were indexed against 100 at which the result of the evaluation of Conventional Example was indexed. A larger index value means a better braking ability on the snow.

Turnability on the Snow:

The experimental tires were mounted on wheels having a rim size of 20×7J and installed in a four-wheel-drive automobile. The air pressure applied to each experimental tire was 220 kPa. When the automobile circularly turned on the snow with a 30-meter radius, the duration for the automobile to make one circular turn was measured. By use of the inverse numbers of the respective measured values, the results of the evaluations of Examples 1 to 5 and Comparative Examples 1 to 2 were indexed against 100 at which the result of the evaluation of Conventional Example was indexed. A larger index value means a better turnability on the snow.

Driving Stability:

The experimental tires were mounted on wheels having a rim size of 20×7J and installed in a four-wheel-drive automobile. The air pressure applied to each experimental tire was 220 kPa. The driving stability on dry road surfaces was evaluated by testing how the test driver felt the driving stability. By use of a five-point scale, the results of the evaluations of Examples 1 to 5 and Comparative Examples 1 to 2 were indexed against a standard value (3 points) at which the result of the evaluation of Conventional Example was indexed. A higher score means a better driving stability on dry road surfaces.

Pattern Noise:

The experimental tires were mounted on wheels having a rim size of 20×7J and installed in a four-wheel-drive automobile. The air pressure applied to each experimental tire was 220 kPa. The pattern noise was evaluated by testing how the test driver felt the pattern noise caused by the experimental tires driving on dry road surfaces. By use of a five-point scale, the results of the evaluations of Examples 1 to 5 and Comparative Examples 1 to 2 were indexed against a standard value (3 points) at which the result of the evaluation of Conventional Example was indexed. A higher score means a lower amount of pattern noise.

As clear from Table 1, the results of the evaluations of the tires according to Examples 1 to 5 were better in the braking ability on the snow, the turnability on the snow, the driving stability and the pattern noise. On the other hand, the tires according to Comparative Example 1 worsened the pattern noise because the distance L between the vertices of each paired V-shaped grooves in the tire circumferential direction was −2 mm. The tires according to Comparative Example 2 worsened the braking ability on the snow and the turnability on the snow, because the relationship in width between the thick groove part and the thin groove part of each V-shaped groove was reversed.

What is claimed is:

1. A pneumatic tire which includes four main grooves each extending in a tire circumferential direction in its tread part, and in which the four main grooves partition the tread part into: a center land part; paired intermediate land parts located with the center land part being interposed in between; and paired shoulder land parts located with the center land part and the paired intermediate land parts being interposed in between, wherein each of the intermediate land parts and the shoulder land parts includes a plurality of V-shaped grooves each configured of: a thick groove part extending in a tire width direction; and a thin groove part extending in the tire circumferential direction, the V-shaped grooves are arranged in a way that each paired V-shaped grooves are opposed to each other in the tire circumferential direction with a connecting groove part being interposed between vertices of the respective paired V-shaped grooves, each thick groove part communicates with any one of the main grooves and the outside of a ground contacting area depending on which land part the thick groove part belongs to, each of the thick grove parts of the paired V-shaped grooves, and the thick grooved parts in the intermediate land parts and adjacent shoulder land parts, are not co-linear with each other, each thin groove part terminates within the land part to which the thin groove part belongs.

2. The pneumatic tire according to claim 1, wherein, in the V-shaped grooves, an inclination angle $\theta 1$ of the thick groove part communicating with its corresponding main groove to the tire circumferential direction is set at 40° to 70°, an inclination angle $\theta 2$ of the thick groove part communicating with the outside of the ground contacting area to the tire circumferential direction is set at 55° to 80°, and an inclination angle $\theta 3$ of the thin groove part to the tire circumferential direction is set at 2° to 20°.

TABLE 1

| | CONVENTIONAL EXAMPLE | COMPARATIVE EXAMPLE 1 | EXAMPLE 1 | EXAMPLE 2 | EXAMPLE 3 | EXAMPLE 4 | EXAMPLE 5 | COMPARATIVE EXAMPLE 2 |
|---|---|---|---|---|---|---|---|---|
| WIDTH OF THICK GROOVE PART (mm) | — | 4.5 | 4.5 | 4.5 | 4.5 | 4.5 | 4.5 | 1.5 |
| WIDTH OF THIN GROOVE PART (mm) | — | 1.5 | 1.5 | 1.5 | 1.5 | 1.5 | 1.5 | 4.5 |
| INCLINATION ANGLE $\theta 1$ (°) | — | 55 | 40 | 55 | 70 | 55 | 55 | 55 |
| INCLINATION ANGLE $\theta 2$ (°) | — | 67 | 55 | 67 | 80 | 67 | 67 | 67 |
| INCLINATION ANGLE $\theta 3$ (°) | — | 6.5 | 2.0 | 6.5 | 20 | 6.5 | 6.5 | 6.5 |
| DISTANCE L (mm) | — | −2.0 | 3.0 | 3.0 | 3.0 | 1.0 | 6.0 | 3.0 |
| BRAKING ABILITY ON SNOW (INDEX) | 100 | 105 | 102 | 105 | 105 | 105 | 105 | 99 |
| TURNABILITY ON SNOW (INDEX) | 100 | 105 | 105 | 105 | 102 | 105 | 105 | 95 |
| DRIVING STABILITY | 3.00 | 3.25 | 3.00 | 3.25 | 3.25 | 3.25 | 3.00 | 3.00 |
| PATTERN NOISE | 3.00 | 2.75 | 3.25 | 3.25 | 3.00 | 3.00 | 3.25 | 3.50 |

3. The pneumatic tire according to claim 1, wherein
a distance L between the vertices of each paired V-shaped grooves in the tire circumferential direction is set at 1 mm to 6 mm.

4. The pneumatic tire according to any one of claims 1 to 3, wherein
the center land part includes: a plurality of notched grooves each extending in the tire width direction; and a plurality of sipes extending in the tire width direction from tip parts of the respective notched grooves, and
the notched grooves and the sipes divide the center land part into blocks arranged one after another in the tire circumferential direction.

5. The pneumatic tire according to any one of claims 1 to 3, wherein
in each of the intermediate land parts and the shoulder land parts, each of blocks demarcated by the V-shaped grooves includes at least one sipe.

6. The pneumatic tire according to any one of claims 1 to 3, wherein
in each of the intermediate land parts and the shoulder land parts, each of blocks demarcated by the V-shaped grooves includes at least one sipe including a sipe communicating with the thick groove part of the V-shaped groove corresponding to the block.

7. The pneumatic tire according to any one of claims 1, wherein
a distance L between the vertices of each paired V-shaped grooves in the tire circumferential direction is set at 2 mm to 4 mm.

\* \* \* \* \*